US010051026B2

(12) United States Patent
Liang et al.

(10) Patent No.: US 10,051,026 B2
(45) Date of Patent: Aug. 14, 2018

(54) REAL-TIME TRANSCODE TRANSFER METHOD AND SYSTEM BASED ON HTTP UNDER DLNA

(71) Applicant: ZTE CORPORATION, Shenzhen City, Guangdong Province (CN)

(72) Inventors: Jiehui Liang, Shenzhen (CN); Fajie Zhao, Shenzhen (CN); Shengjuan Wang, Shenzhen (CN)

(73) Assignee: XI'AN ZHONGXING NEW SOFTWARE CO., LTD., Xi'An, Shaanxi, P.R. (CN)

( * ) Notice: Subject to any disclaimer, the term of this patent is extended or adjusted under 35 U.S.C. 154(b) by 637 days.

(21) Appl. No.: 14/428,732

(22) PCT Filed: Jul. 1, 2013

(86) PCT No.: PCT/CN2013/078619
§ 371 (c)(1),
(2) Date: Mar. 17, 2015

(87) PCT Pub. No.: WO2013/170811
PCT Pub. Date: Nov. 21, 2013

(65) Prior Publication Data
US 2015/0237091 A1 Aug. 20, 2015

(30) Foreign Application Priority Data
Sep. 18, 2012 (CN) .......................... 2012 1 0346503

(51) Int. Cl.
*G06F 15/16* (2006.01)
*H04L 29/06* (2006.01)
*H04L 29/08* (2006.01)

(52) U.S. Cl.
CPC .............. *H04L 65/60* (2013.01); *H04L 67/10* (2013.01)

(58) Field of Classification Search
CPC ................................ H04L 65/60; H04L 67/10
(Continued)

(56) References Cited

U.S. PATENT DOCUMENTS

2011/0035466 A1* 2/2011 Panigrahi ............. H04N 21/222
709/219
2011/0320572 A1* 12/2011 Damola ............ H04L 29/12377
709/219
2014/0032777 A1* 1/2014 Yuan ....................... H04L 67/26
709/231

FOREIGN PATENT DOCUMENTS

CN         1980242 A     6/2007
CN     101056277 A    10/2007
(Continued)

OTHER PUBLICATIONS

Chunked transfer encoding Wikipedia, the free encyclopedia, Sep. 5, 2012, XP055211789.
(Continued)

*Primary Examiner* — Taylor Elfervig
*Assistant Examiner* — Oluwatosin Gidado
(74) *Attorney, Agent, or Firm* — Ling Wu; Stephen Yang; Ling and Yang Intellectual Property

(57) ABSTRACT

Disclosed is a real-time transcode transfer method based on HTTP under DLNA, including: matching playing capability information with media item resource information, and according to the matching result, acquiring data of multimedia content from a digital media server. Also disclosed is a real-time transcode transfer system based on the HTTP under the DLNA. The present document can be used to realize the real-time transcoding of multimedia content and the real-time rebroadcasting of live stream based on the HTTP under the DLNA.

4 Claims, 3 Drawing Sheets

(58) Field of Classification Search
USPC .......................................................... 709/219
See application file for complete search history.

(56) References Cited

FOREIGN PATENT DOCUMENTS

| | | | |
|---|---|---|---|
| CN | 102447693 | A | 5/2012 |
| EP | 1845683 | A1 | 10/2007 |
| KR | 20110003211 | A | 1/2011 |
| WO | 2009034483 | A1 | 3/2009 |

OTHER PUBLICATIONS

Hypertext Transfer Protocol—HTTP/1.1; R. Fielding, UC Irvine et al; Category: Standards Track. Net working Group; Jun. 1999; XP015008399.

* cited by examiner

REAL-TIME TRANSCODE TRANSFER METHOD AND SYSTEM BASED ON HTTP UNDER DLNA

TECHNICAL FIELD

The present document relates to the field of multimedia technology, and more particularly, to a real-time transcode transfer method and system based on the Hypertext Transfer Protocol (HTTP) under the Digital Living Network Alliance (DLNA).

BACKGROUND OF THE RELATED ART

DLNA-based devices can be divided into: Digital Media Server/Mobile-Digital Media Server (DMS/M-DMS), Digital Media Player/Mobile-Digital Media Player (DMP/M-DMP), Digital Media Controller/Mobile-Digital Media Controller (DMC/M-DMC) and Digital Media Renderer (DMR). The digital media server is responsible for publishing multimedia content shared by users, and the type of multimedia content comprise picture, music and video, and the multimedia content can be encoded with different encoding modes and encapsulated with different file formats. The digital media player and the digital media renderer play multimedia content shared by the digital media server, and due to the capacity constraints of device, the file formats and encoding modes supported by the digital media player and the digital media server, as well as the file formats and digital media encoding modes supported by the digital media renderer and the digital media server, are different, resulting in that the digital media player and the digital media renderer cannot play all the multimedia content shared by the digital media server, in which case the digital media server needs to real-time transcode the multimedia content.

Real-time transcoding the multimedia content often requires the digital media server using the real-time streaming protocol (RTSP), when the digital media server uses the Hypertext Transfer Protocol (HTTP) to transfer data, the following questions will be encountered:

1, under normal circumstances, the digital media server which uses the HTTP to transfer data must explicitly know the data size of the multimedia content to be transferred, which requires the digital media server must pre-convert the multimedia content into a file with a specified format when achieving the multimedia transcoding function, and then it performs the HTTP transfer, which inevitably have a relatively large delay, thereby resulting in that the digital media server is unable to real-time transfer the data of multimedia content, such as digital television data, camera video data and so on, which greatly reduces the experiences of DLNA user on digital media service;

2, in the case that the data size of multimedia content to be transferred cannot be explicitly learned, the digital media server can use the Chunked Transfer Encoding (CTC) mechanism in the HTTP to real-time transfer the data of multimedia content, that is, the digital media server performs chunked transfer encoding on the data of multimedia content to transfer the data of multimedia content in the form of data blocks, and when there is no data to be sent, data blocks carrying the information that the length of data block is zero are sent, representing that the data is transferred completely, and the first byte of each data block indicates the size of data block and the byte does not comprise a Carriage Return/Line Feed (CRLF), and each data block takes the CRLF as the ending flag of a data block; when the abovementioned scheme is used to transfer the Extensible Markup Language (XML) data, the problem that the data cannot be real-time transferred because the size of data to be transferred is unknown during the HTTP transfer can be effectively solved, but when the abovementioned scheme is used to transfer data of multimedia content, it has the following problems:

1) when the CRLF is taken as the ending of each data block, since the data of multimedia content itself contains the CRLF, the CRLF can be mistaken as the ending flag of the data block transfer, thereby leading to the loss of data after the CRLF in the data block;

2) the block extension information is not fully utilized to provide relevant information of the data block.

In summary, due to the presence of the abovementioned limitations when the digital media server transfers the data of multimedia content via the HTTP, the digital media server can only real-time transcode and transfer the data of multimedia content via the RTSP or the HTTP live streaming (HLS) protocol rather than the HTTP.

SUMMARY OF THE INVENTION

In view of this, the main objective of the present document is to provide a real-time transcode transfer method and system based on HTTP under DLNA to real-time transcode and transfer data of multimedia content when transferring the data of multimedia content.

To achieve the abovementioned objective, the technical scheme of the present document is achieved as:

the present document provides a real-time transcode transfer method based on HTTP under DLNA, and the method comprises:

matching playing capability information with media item resource information, acquiring data of multimedia content from a digital media server according to a matching result.

Preferably, said acquiring data of multimedia content from a digital media server according to the matching result comprises: playing the data of multimedia content directly acquired from the digital media server according to the matching result, or sending the matching result to the digital media server, receiving the data of multimedia content on which transcoding and HTTP chunked transfer encoding are performed by the digital media server according to the matching result.

Preferably, said matching the playing capability information with the media item resource information comprises:

the digital media server sending the media item resource information to a digital media player; the digital media player matching its own playing capability information with the media item resource information.

Preferably, the media item resource information comprises: an original resource item, a special resource item, and a full matching resource item;

said directly acquiring the data of multimedia content from the digital media server according to the matching result, or sending the matching result to the digital media server, or receiving the data of multimedia content on which the transcoding and HTTP chunked transfer encoding are performed by the digital media server according to the matching result comprises:

when the digital media player is able to match with the original resource item, directly acquiring the data of multimedia content from the digital media server;

when the digital media player is unable to match with the original resource item but able to match with the special resource item or the full matching resource item, sending the matching result to the digital media server and receiving the data of multimedia content on which the transcoding and HTTP chunked transfer encoding are performed by the digital media server according to the matching result.

Preferably, said matching the playing capability information with the media item resource information comprises:

the digital media server sending the media item resource information to the digital media controller; the digital media controller acquiring playing capability information of a digital media renderer, and matching the playing capability information with the media item resource information.

Preferably, the media item resource information comprises: an original resource item, a special resource item, and a full matching resource item;

said directly acquiring the data of multimedia content from the digital media server according to the matching result, or sending the matching result to the digital media server, and receiving the data of multimedia content on which the transcoding and HTTP chunked transfer encoding are performed by the digital media server according to the matching result comprises:

when the digital media controller is able to match with the original resource item, sending the matching result to the digital media renderer, and the digital media renderer directly acquiring the data of multimedia content from the digital media server according to the matching result;

when the digital media controller is unable to match with the original resource item but able to match with the special resource item or the full matching resource item, sending the matching result to the digital media server, and the digital media renderer receiving the data of multimedia content on which the transcoding and HTTP chunked transfer encoding are performed by the digital media server according to the matching result.

Preferably, the special resource item comprises: one or more of a transport stream (TS) resource item, a MP4 resource item and a partial resource item.

Preferably, the HTTP chunked transfer encoding comprises: dividing the data of multimedia content into common data blocks and ending block for transfer; wherein the common data blocks comprise: data block length information, data block extension information, an extension information separator, data block data and a separator; the ending block comprises: ending block length information and a separator, and the length of the ending block is zero.

Preferably, the data block extension information comprises: a data block type, a data block content encoding mode and a decoding timestamp of data block content; and/or, the extension information separator and the separator are a carriage return/line feed character; and/or, the data block length information occupies 4 bytes of a network byte order, and the maximum length of each data block is $(2^{32}-1)$ bytes.

The present document further provides a real-time transcode transfer system based on HTTP under DLNA, and the system comprises:

a digital media controller, configured to match media item resource information with playing capability information of a digital media renderer, and send a matching result to the digital media renderer;

the digital media renderer, configured to receive the matching result sent by the digital media controller and acquire data of multimedia content according to the matching result;

a digital media player, configured to match its own playing capability information with the media item resource information, and acquire the data of multimedia content according to the matching result.

Preferably, the system further comprises: a digital media server, configured to receive the matching result sent by the digital media player or the digital media controller, perform transcoding and HTTP chunked transfer encoding on the data of multimedia content according to the matching result, and transfer the data to a corresponding digital media player or the digital media renderer;

the digital media renderer is further configured to directly acquire the data of multimedia content from the digital media server according to the matching result, or receive the data of multimedia content on which transcoding and HTTP chunked transfer encoding are performed by the digital media server;

the digital media player is further configured to directly acquire the data of multimedia content from the digital media server according to the matching result, or send the matching result to the digital media server, and receive the data of multimedia content on which the transcoding and HTTP chunked transfer encoding are performed by the digital media server according to the matching result.

Preferably, the digital media server is further configured to send the media item resource information to the digital media player;

the digital media player is further configured to match its own playing capability information with the media item resource information.

Preferably, the digital media player is further configured to, when being able to match with the original resource item, directly acquire the data of multimedia content from the digital media server; when being unable to match with the original resource item but being able to match with the special resource item or the full matching resource item, send the matching result to the digital media server and receive the data of multimedia content on which the transcoding and HTTP chunked transfer encoding are performed by the digital media server according to the matching result.

Preferably, the digital media server is further configured to send the media item resource information to the digital media controller;

the digital media controller is further configured to acquire the playing capability information of the digital media renderer, and match the playing capability information with the media item resource information.

Preferably, the media item resource information comprises: an original resource item, a special resource item, and a full matching resource item;

the digital media controller is further configured to, when being able to match with the original resource item, send the matching result to the digital media renderer; when being unable to match with the original resource item but being able to match with the special resource item or the full matching resource item, send the matching result to the digital media server;

the digital media renderer is further configured to, when receiving a matching result of matching with the original resource item, directly acquire the data of multimedia content from the digital media server; receive the data of multimedia content on which the transcoding and HTTP chunked transfer encoding are performed by the digital media server according to the matching result.

The advantages of the real-time transcode transfer method and system based on HTTP under DLNA provided in the present document are: the digital media server in the DLNA generates media item resource information of the multimedia content, and matches the playing capability of the digital media player or the digital media renderer with the media item resource information, directly acquiring the data of multimedia content from the digital media server according to the matching result, or the digital media server uses the improved HTTP chunked transfer encoding mechanism to transfer the data of multimedia content, that is, performing the transcoding and HTTP chunked transfer encoding on the data of multimedia content to be transferred, and then the data is transferred to the digital media player or the digital media renderer, and the digital media player or the digital media renderer plays the data, so as to achieve real-time transcoding the multimedia content and real-time broadcasting the live stream under the DLNA without using the RTSP or HLS protocol, which greatly improves the capability of supporting encoding modes and file formats of shared multimedia content in the DLNA network, and achieves real-time transcoding and transferring of multimedia content under the DLNA.

PREFERRED EMBODIMENTS OF THE INVENTION

The basic idea of the present document is: matching the playing capability information with the media item resource information, directly acquiring the data of multimedia content from the digital media server according to the matching result, or receiving the data of multimedia content on which the transcoding and HTTP chunked transfer encoding are performed by the digital media server according to the matching result.

Hereinafter, the implementation process of the embodiment of the present invention will be described in detail with combination of the accompanying figures.

The real-time transcode transfer system based on HTTP under DLNA in accordance with an embodiment of the present invention mainly comprises: a digital media server, a digital media player, a digital media renderer and a digital media controller.

Figure 1:
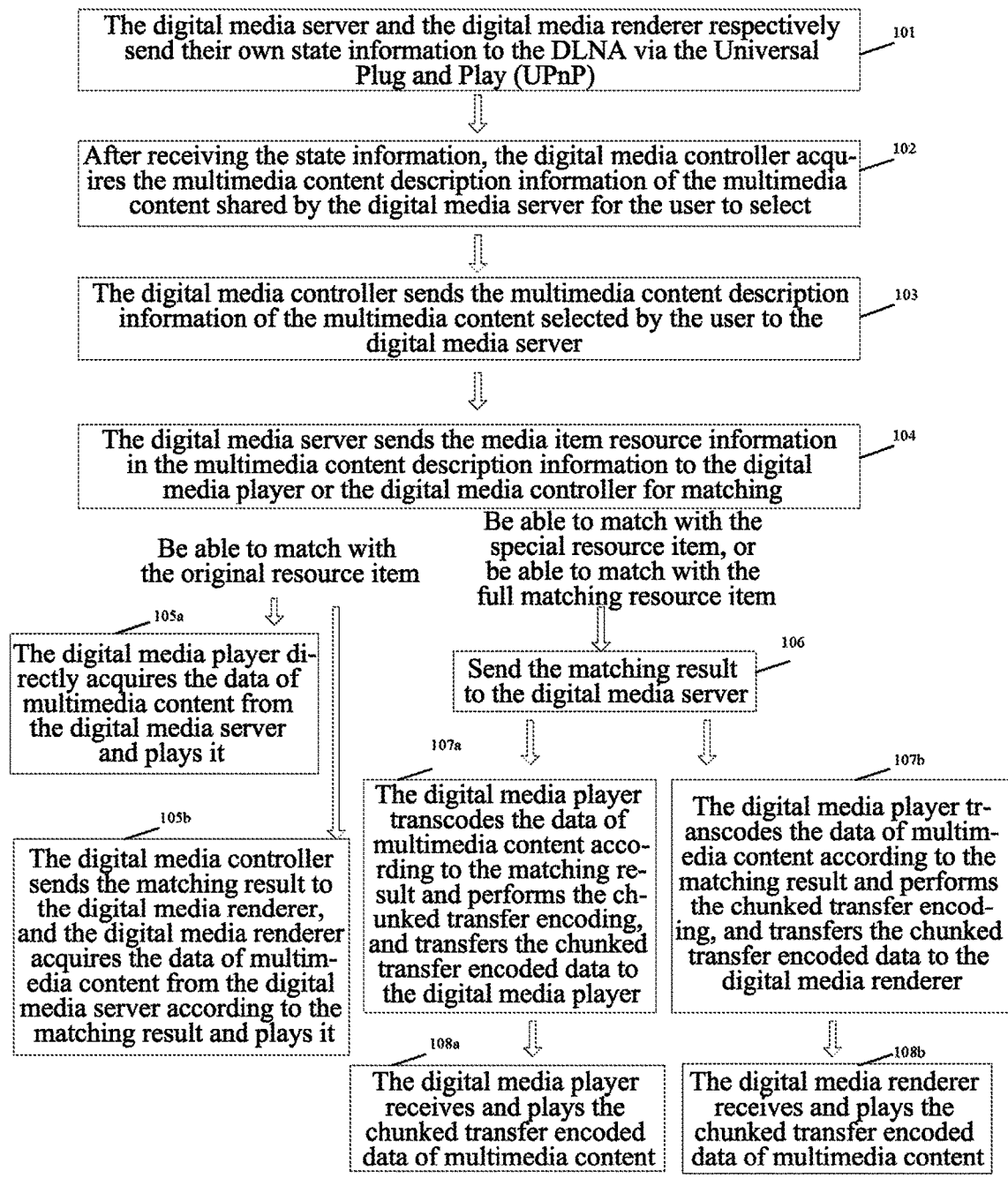
FIG. 1 is a flow chart of the implementation of a real-time transcode transfer method based on HTTP under DLNA in accordance with an embodiment of the present invention.

Based on the abovementioned system, the real-time transcode transfer method based on HTTP under DLNA in accordance with an embodiment of the present invention, as shown in FIG. 1, has the specific steps as follows:

in step 101: the digital media server and the digital media renderer respectively send their own state information to all devices in the DLNA network via the Universal Plug and Play (UPnP) protocol;

the digital media server and the digital media renderer notify each device in the DLNA network that their own states are normal through their own state information.

In step 102: after receiving the state information, the digital media controller acquires the multimedia content description information of the multimedia content shared by the digital media server for the user to select;

the user can select the certain multimedia content to play in the digital media renderer or the digital media player through the multimedia content description information provided by the digital media controller.

In step 103: the digital media controller sends the multimedia content description information of the multimedia content selected by the user to the digital media server;

wherein the multimedia content description information is described with the digital item declaration language (DIDL), comprising: a media item identifier, an upper layer media item identifier, whether the media item can be modified or not, a media item title, a media item creation date, a media item type, and media item resource (res) information.

The media item identifier uniquely identifies one piece of multimedia content to distinguish different multimedia contents in the digital media service;

The upper layer media item identifier is the identifier of an upper level container where the multimedia content is located, and it is used by the digital media controller during browsing;

the media item type is the type of multimedia content, such as audio, video or picture;

the media item resource information is the multimedia content accessing mode, comprising the Uniform Resource Locator (URL), the number of multimedia content bytes and the Multipurpose Internet Mail Extensions (MIME) type of the multimedia content.

In step 104: the digital media server sends the media item resource information in the multimedia content description information of the multimedia content selected by the user to the digital media player or the digital media controller for matching;

wherein the media item resource information comprises an original resource item, a full matching resource item and a special resource item;

wherein the original resource item is the multimedia content's own format type;

the full matching resource item identifies the format types supported by the playing capability of the digital media player or the digital media renderer;

the special resource item identifies the target format type that the format conversion is performed on the multimedia contents.

The special resource item may comprise: one or more of a transport stream (TS) resource item, a MP4 resource item and a partial resource item;

herein, the TS resource item identifies that the multimedia content selected by the user can be converted into a transport stream in the MP4 format;

the MP4 resource item identifies that the multimedia content selected by the user can be converted into a file in the MP4 format;

the partial resource item identifies that only the video stream of the multimedia content selected by the user is converted into video frames encoded with a specific encoding mode, such as the H264 encoding mode; alternatively, only the audio stream of the multimedia content selected by the user is converted into audio frames encoded with a specific encoding mode such as the Advanced Audio Coding (AAC). Therefore, the requirements that the digital media player or the digital media renderer can only play multimedia contents encoded with special encoding modes can be matched;

the full matching resource item identifies that the video stream of the multimedia content selected by the user can be converted into video frames encoded with the H264 encoding mode, and the audio stream of the multimedia content selected by the user can be converted into audio frames encoded with the AAC mode;

wherein the H264 encoding mode can adopt the H.264 Baseline Profile 3.1;

the AAC mode can adopt the AAC low complexity (LC) Profile.

When the matching result in step 104 is the original resource item, it is to correspondingly execute step 105; when the matching result is the special resource item or the full matching resource item, it is to correspondingly execute step 106 to step 107;

specifically, in step 102, the user selects the certain multimedia content to play in the digital media player, and in step 104, the digital media player matches its own playing capability information with the media item resource information, and when the original resource item can be matched, it is to execute step 105a, that is, the digital media player acquires the data of multimedia content selected by the user from the digital media server and plays it;

in step 102, the user selects the certain multimedia content to play in the digital media renderer, and in step 104, the digital media controller matches the acquired playing capability information of the digital media renderer with the received media item resource information, and when the original resource item can be matched, it is to execute step 104b, that is, the digital media controller sends the matching result to the digital media renderer, and the digital media renderer directly acquires the data of multimedia content selected by the user from the digital media server according to the matching result and plays it;

in step 102, the user selects the certain media content to play in the digital media player, and in step 104, when the digital media player is unable to match with the original resource item but able to match with the special resource item, or the digital media player is unable to match with the original resource item or the special resource item but able to match with the full matching resource item, it is to execute step 106, that is, the matching result is sent to the digital media server and step 107a and step 108a are sequentially executed, that is, the digital media player sends the matching result to the digital media server, thereafter it is to execute step 106, that is, after the digital media server transcodes the data of multimedia content according to the matching result, it performs chunked transfer encoding on the transcoded data of multimedia content with the HTTP CTE mechanism and sends the chunked transfer encoded data to the digital media player, and the digital media player receives and plays the chunked transfer encoded data of multimedia content;

in step 102, the user selects the certain multimedia content to play in the digital media renderer, and in step 104, when the digital media controller is unable to match with the original resource item but able to match with the special resource item, or the digital media controller is unable to match with the original resource item or the special resource item but able to match with the full matching resource item, it is to execute step 106, that is, the digital media controller sends the matching result to the digital media server, then it is to execute step 107b and step 108b, that is, the digital media server transcodes the data of multimedia content according to the matching result and uses the HTTP CTE to perform chunked transfer encoding, and then send the chunked transfer encoded data to the digital media renderer, and the digital media renderer receives and plays the chunked transfer encoded data of multimedia content.

Specifically, in step 102, the user selects the certain multimedia content to play in the digital media player, and in the step 104, when the digital media player is able to match with the special resource item, comprising: matching with the TS resource item, the MP4 resource item and the partial resource item, or able to match with the full matching resource item, it is to execute step 106, that is, the digital media player sends the matching result to the digital media server, and it is to execute step 107a and step 108a, that is, the digital media server transcodes the data of multimedia content and then performs chunked transfer encoding, and it sends the chunked transfer encoded data to the digital media player, and the digital media player receives and plays the chunked transfer encoded data of multimedia content.

Specifically, in step 102, the user selects the certain multimedia content to play in the digital media renderer, and when the digital media controller is able to match with the TS resource item, the MP4 resource item, the partial resource item and other special resource items, or able to match with the full matching resource item, it is to execute step 106, that is, the digital media controller sends the matching result to the digital media server, and then it is to execute step 107b and step 108b, that is, the digital media server transcodes the data of multimedia content and then performs chunked transfer encoding, and it sends the chunked transfer encoded data to the digital media renderer, and the digital media renderer receives and plays the chunked transfer encoded data of multimedia content.

When the digital media player or the digital media controller can match with the full matching resource item or the partial resource item, the digital media player or the digital media renderer must support the following video encoding mode and audio encoding mode:

the video encoding mode: H264 encoding mode, such as H.264 Baseline Profile 3.1, the audio coding mode: AAC mode, such as AAC-LC Profile.

When receiving the matching result of matching with the full matching resource item or the partial resource item, the digital media server does not perform file format encapsulation on the data of multimedia content, but uses the HTTP CTE to transfer the data of multimedia content, that is, chunked transfer encoding is performed on the data of multimedia content to acquire data blocks, and the data blocks are sent frame by frame, and the extension information of the data blocks carries the frame type information (indicating that the frames corresponding to the data blocks are audio frames or video frames) as well as the decoding timestamp of frame (decoding timestamp of audio frame or decoding timestamp of video frame), so that the digital media player or the digital media renderer at the receiving end can perform decoding normally, thereby achieving the real-time transcoding and transferring of multimedia content based on the HTTP.

The data of multimedia content on which chunked transfer encoding has been performed by the digital media server comprise a plurality of common data blocks and one ending block, and the video frames or audio frames are transferred in the form of common data blocks, after the video frames or audio frames corresponding to the multimedia content are transferred completely, the ending block is transferred to indicate that the multimedia content is transferred completely, and the length information carried in the ending block is zero.

In step 106, when the digital media server receives the matching result of matching with the TS resource item or the MP4 resource item, it is to real-time convert the multimedia content selected by the user to a transport stream in the MP4 format, encapsulate the real-time converted transport stream in the MP4 format into TS frames, and encapsulate each TS frame into one common data block, and send the TS frames (common data blocks) frame by frame, and the data block extension information content of a common data block carries the type information of the frame (indicating that the frame is a TS frame), so that the digital media player or the digital media renderer at the receiving end can decode normally, thereby achieving the real-time transcoding and transferring of multimedia content based on the HTTP;

wherein the TS frames comprise: video frames, and/or audio frames, and the corresponding video frame and/or decoding timestamp of audio frame;

the MP4 resource item identifies that the multimedia content selected by the user can be converted into a file in the MP4 format.

The file in the MP4 format may use different encoding methods, in the embodiment of the present invention, the content acquired by encoding the multimedia content selected by the user via a specific encoding mode is called as transport stream in a specific format; it can be seen that, the MP4 resource item identifies that the multimedia content selected by the user is converted into a transport stream in a specific format, thereafter the real-time converted transport stream in the specific format is encapsulated into MP4 frames, and the MP4 frames are encapsulated into one HTTP chunked transfer encoded common data block, so that it is possible to send the MP4 frame in the form of common data block, and the extension information of the common data block indicates that the frame encapsulated in the data block is a MP4 frame, so that the digital media player or the digital media renderer at the receiving end can decode normally, thereby achieving the real-time transcoding and transferring of multimedia contents based on the HTTP;

wherein the length information of the common data block encapsulating the MP4 frame occupies four bytes, therefore the maximum length of the common data block is $(2^{32}-1)$ bytes, and the MP4 frame comprises: a video frame, and/or an audio frame, as well as the corresponding decoding timestamp of audio frame and/or decoding timestamp of video frame.

Figure 2:
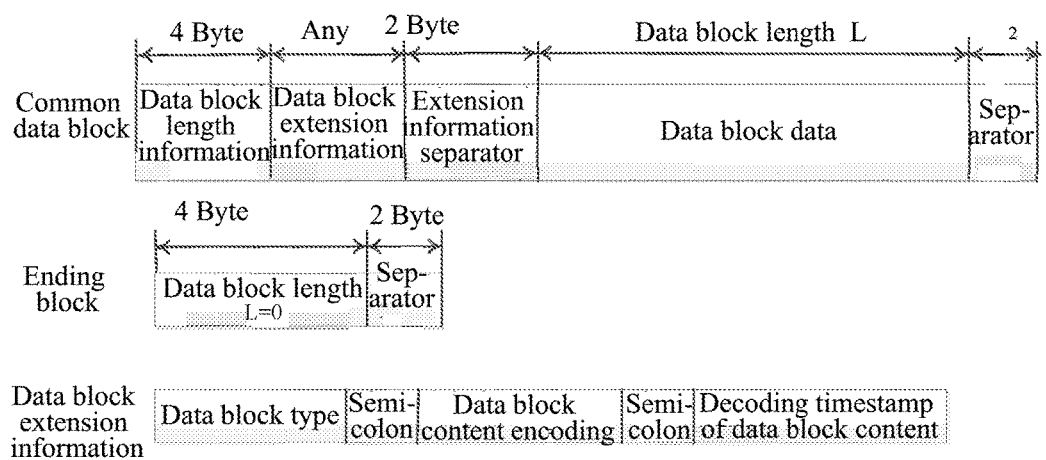
FIG. 2 is a schematic diagram of the data structure of a HTTP chunked transfer encoded data block in accordance with an embodiment of the present invention.

FIG. 2 is a schematic diagram of the data structure of a HTTP chunked transfer encoded data block in accordance with an embodiment of the present invention, and the digital media server uses the HTTP CTE mechanism to perform chunked transfer encoding on the data of multimedia content in accordance with the structure shown in FIG. 2, and the chunked transfer encoded data of multimedia content comprise a plurality of common data blocks and one ending block, and the ending block is transferred when all the common data blocks are transferred completely, to indicate that the data of multimedia content are transferred completely; wherein, the data structure of the common data block comprises: data block length information, data block extension information, extension information separator, data block data and separator;

the data structure of the ending block comprises: data block length information and separator, and the length L of the ending block is zero;

the data block extension information comprises: data block type, data block content encoding mode and decoding timestamp of data block content; wherein the type of decoding timestamp of data block content comprises: decoding timestamp of audio frame and/or decoding timestamp of video frame; the data block type comprises: audio frame, video frame, TS frame and MP4 frame.

The length of the data block extension information can be set to any value.

Both the extension information separator and the separator are CRLF character, occupying two bytes;

the data block length information occupies 4 bytes of the network byte order, and the maximum length of each data block is $(2^{32}-1)$ bytes.

Figure 3:
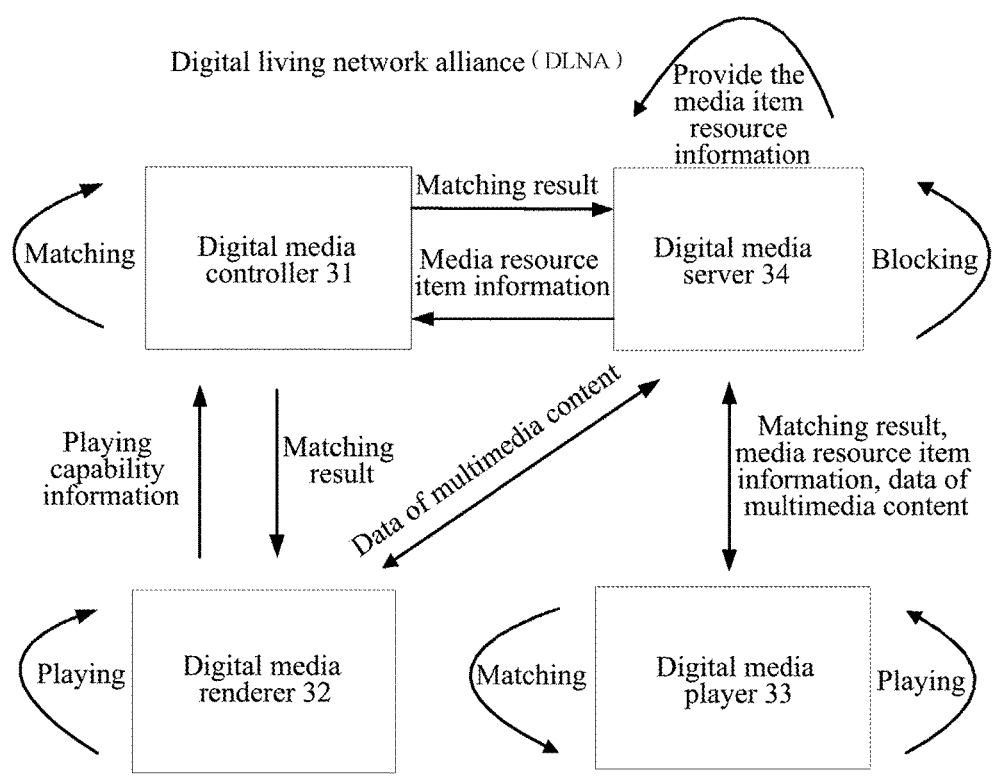
FIG. 3 is a schematic diagram of the composition structure of a real-time transcode transfer system based on HTTP under DLNA in accordance with an embodiment of the present invention.

FIG. 3 is an schematic diagram of the composition structure of a real-time transcode transfer system based on HTTP under DLNA in accordance with an embodiment of the present invention, and as shown in FIG. 3, the system comprises: digital media controller 31, digital media renderer 32 and digital media player 33; wherein the digital media controller 31 is configured to match the media item resource information with the playing capability information of the digital media renderer 32, and send the matching result to the digital media renderer 32;

the digital media renderer 32 is configured to receive the matching result sent by the digital media controller 31, and acquire the data of multimedia content according to the matching result;

the digital media player 33 is configured to match its own playing capability information with the media item resource information, and acquire the data of multimedia content according to the matching result.

The system further comprises: digital media server 34, which is configured to receive the matching result sent by the digital media player 33 or the digital media controller 31, perform transcoding and HTTP chunked transfer encoding on the data of multimedia content according to the matching result, and then transfer the chunked transfer encoded data to the corresponding digital media player 33 or the digital media renderer 32;

the digital media renderer 32 is further configured to directly acquire the data of multimedia content from the digital media server 34 according to the matching result, or receive the data of multimedia content on which transcoding and HTTP chunked transfer encoding are performed by the digital media server 34;

the digital media player 33 is further configured to directly acquire the data of multimedia content from the digital media server 34 according to the matching result, or, send the matching result to the digital media server 34, and receive the data of multimedia content on which the transcoding and HTTP chunked transfer encoding are performed by the digital media server 34 according to the matching result.

The digital media server 34 is further configured to send the media item resource information to the digital media player 33;

the digital media player 33 is further configured to match its own playing capability information with the media item resource information.

The media item resource information comprises: an original resource item, a special resource item, and a full matching resource item;

the digital media player 33 is further configured to: when being able to match with the original resource item, directly acquire the data of multimedia content from the digital media server 34; when being unable to match with the original resource item but being able to match with the special resource item or the full matching resource item, send the matching result to the digital media server 34, and receive the data of multimedia content on which transcoding and HTTP chunked transfer encoding are performed by the digital media server 34 according to the matching result.

The digital media server 34 is further configured to send the media item resource information to the digital media controller 31;

the digital media controller 31 is further configured to acquire the playing capability information of the digital media renderer 32, and match the playing capability information with the media item resource information.

The media item resource information comprises: the original resource item, the special resource item, and the full matching resource item;

the digital media controller 31 is further configured to: when being able to match with the original resource item, send the matching result to the digital media renderer 32; when being unable to match with the original resource item but being able to match with the special resource item or the full matching resource item, send the matching result to the digital media server 34;

the digital media renderer 32 is further configured to: when receiving the matching result of matching with the original resource item, directly acquire the data of multimedia content from the digital media server 34; receive the data of multimedia content on which the transcoding and HTTP chunked transfer encoding are performed by the digital media server 34 according to the matching result.

The First Embodiment

The digital media server stores the multimedia content, such as a certain windows media video (WMV) source, the digital media server describes each multimedia content via the DIDL as follows, and the following contents are collectively referred to as the multimedia content description information:

1) media item identifier, 2) upper layer media item identifier, 3) whether the media item can be modified or not, 4) media item title, 5) media item creation date, 6) media item type, 7) media item resource information;

the digital media controller acquires the multimedia content description information of the multimedia content by interacting with the digital multimedia server, and the user specifies a certain WMV source to play in the digital media renderer by selecting the multimedia content description information provided by the digital media controller, and after the digital media controller sends the multimedia content description information of the WMV video source selected by the user to the digital media server, the following specific process is used to implement the real-time transcoding and transferring based on the HTTP under the DLAN:

step 10: the digital media server sends the media item resource information of the WMV source to the digital media controller for matching;

wherein the media item resource information comprises: original resource item, TS resource item, MP4 resource item, partial resource item and full matching resource item; usually the first item in the media item resource information is the original resource item, the last item is the full matching resource term, and the middle terms are the TS resource item, the MP4 resource item and the partial resource item;

wherein the TS resource item identifies that the WMV source can be converted into a TS stream in the MP4 format;

the MP4 resource item identifies that the WMV source can be converted into a file in the MP4 format;

the partial resource item identifies that the audio stream of the WMV source can be converted into the MP3 format;

the full matching resource term identifies that the video stream of the WMV source can be converted into video frames encoded with the H264 encoding mode, and the audio stream of the WMV source is converted into audio frames encoded with the Advanced Audio Coding (AAC) mode;

wherein the H264 encoding mode can adopt H.264 Baseline Profile 3.1;

the AAC mode can adopt the AAC-LC Profile.

In step 20: the digital media controller acquires the playing capability information of the digital media renderer, and matches the acquired playing capability information with the media item resource information, assuming that the matching result is matching with the full matching resource item, the digital media controller sends the matching result to the digital media server;

In step 30: after receiving the matching result, the digital media server performs transcoding on the data of the WMV source and then performs chunked transfer encoding, then sends the chunked transfer encoded data in the form of common data blocks frame by frame to the digital media renderer for playing.

The chunked transfer encoded data comprise a plurality of common data blocks and the ending data block, and the digital media server indicates that the data transfer is completed by sending a data block whose data block length information is zero.

The digital media renderer supports the following video encoding mode and audio encoding mode:

the video encoding: H264 encoding mode, such as H.264 Baseline Profile 3.1; the audio coding: AAC profile, such as AAC-LC Profile.

The Second Embodiment

The digital media server stores the multimedia content (such as a certain WMV source), and the digital media server describes each multimedia content via the DIDL as follows, and the following contents are collectively referred to as the multimedia content description information:

1) media item identifier, 2) upper layer media item identifier, 3) whether the media item can be modified or not, 4) media item title, 5) media item creation date, 6) media item type, 7) media item resource (res) information;

the digital media controller acquires the multimedia content description information of the multimedia content by interacting with the digital multimedia server, and the user specifies a certain WMV video source to play in the digital media renderer by selecting the multimedia content description information provided by the digital media controller, and after the digital media controller sends the multimedia content description information of the WMV video source selected by the user to the digital media server, the following specific process is used to implement the real-time transcoding and transferring based on the HTTP:

in step 301: the digital media server sends the media item resource information of the WMV video source to the digital media controller for matching;

wherein the media item resource information comprises: the original resource item, the TS resource item, the MP4 resource item, the partial resource item and the full matching resource item; usually the first item is the original resource item, the last item is the full matching resource term, and the middle terms are the TS resource item, the MP4 resource item and the partial resource item;

wherein the TS resource item identifies that the WMV video source can be converted into a TS stream in the MP4 format;

the MP4 resource item identifies that the WMV video source can be converted into a file in the MP4 format;

the partial resource item identifies that only the audio stream of the WMV video source is converted into audio frames encoded with the AAC mode; or only the video stream of the WMV video source is converted into video frames encoded with the H264 encoding mode;

the full matching resource term identifies that the video stream of WMV source can be converted into video frames encoded with the H264 encoding mode, and the audio stream of the WMV source is converted into audio frames encoded with the Advanced Audio Coding (AAC) mode;

wherein the H264 encoding mode can adopt H.264 Baseline Profile 3.1;

the AAC mode can adopt the AAC-LC Profile.

In step 302: the digital media player matches its own playing capability information with the media item resource information, assuming that the matching result is the full matching resource item, then the digital media player sends the matching result to the digital media server;

in step 303: after receiving the above matching result, the digital media server performs transcoding on the data of WMV video source and then performs chunked transfer encoding, and then sends the chunked transfer encoded data in the form of common data blocks frame by frame to the digital media player for playing.

The chunked transfer encoded data comprise a plurality of common data blocks and the ending data block, and the digital media server indicates that the data transfer is completed by sending a data block whose data block length information is zero.

The digital media player supports the following video encoding mode and audio encoding mode:

the video encoding mode: H264 encoding mode, such as H.264 Baseline Profile 3.1;

the audio encoding mode: AAC profile, such as AAC-LC Profile.

The above description is only preferred embodiments of the present invention and is not intended to limit the protection scope of the present document.

What is claimed is:

1. A real-time transcode transfer method based on hypertext transfer protocol (HTTP) under digital living network alliance (DLNA), wherein the method comprises:

matching playing capability information with media item resource information, acquiring data of multimedia content from a digital media server according to a matching result, wherein said matching playing capability information with media item resource information, acquiring data of multimedia content from a digital media server according to a matching result comprise:

the digital media server sending the media item resource information to a digital media player; the digital media player matching playing capability information of the digital media player with the media item resource information; when the digital media player is able to match with the original resource item, directly acquiring data of multimedia content from the digital media server; when the digital media player is unable to match with the original resource item but able to match with the special resource item or the full matching resource item, sending the matching result to the digital media server and receiving data of multimedia content on which the transcoding and HTTP chunked transfer encoding are performed by the digital media server according to the matching result, or the digital media server sending the media item resource information to a digital media controller; the digital media controller acquiring playing capability information of a digital media renderer, and matching the playing capability information with the media item resource information; when the digital media controller is able to match with the original resource item, sending the matching result to the digital media renderer, and the digital media renderer directly acquiring data of multimedia content from the digital media server according to the matching result; when the digital media controller is unable to match with the original resource item but able to match with the special resource item or the full matching resource item, sending the matching result to the digital media server, and the digital media renderer receiving data of multimedia content on which the transcoding and HTTP chunked transfer encoding are performed by the digital media server according to the matching result;

wherein the media item resource information comprises: an original resource item, a special resource item and a full matching resource item.

2. The method of claim 1, wherein the special resource item comprises: one or more of a transport stream (TS) resource item, a MP4 resource item and a partial resource item.

3. The method of claim 1, wherein the HTTP chunked transfer encoding comprises: dividing data of multimedia content into common data blocks and an ending block;

the common data blocks comprise: data block length information, data block extension information, extension information separator, data block data and a separator;

the ending block comprises: ending block length information and a separator, and the length of the ending block is zero.

4. The method of claim 3, wherein the data block extension information comprises: a data block type, a data block content encoding mode and a decoding timestamp of data block content; and/or, the extension information separator and the separator are a carriage return/line feed character; and/or, the data block length information occupies 4 bytes of a network byte order, and the maximum length of each data block is $(2^{32}-1)$ bytes.

* * * * *